United States Patent
Chamberlin et al.

(10) Patent No.: US 9,577,486 B2
(45) Date of Patent: Feb. 21, 2017

(54) CONDUCTOR RETENTION MEMBER FOR A STATOR ASSEMBLY

(71) Applicant: REMY TECHNOLOGIES, L.L.C., Pendleton, IN (US)

(72) Inventors: Bradley D. Chamberlin, Pendleton, IN (US); Richard Trammell, Noblesville, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 276 days.

(21) Appl. No.: 14/247,659

(22) Filed: Apr. 8, 2014

(65) Prior Publication Data

US 2015/0288242 A1    Oct. 8, 2015

(51) Int. Cl.
   *H02K 3/487* (2006.01)
   *H02K 3/50* (2006.01)

(52) U.S. Cl.
   CPC ............... *H02K 3/487* (2013.01); *H02K 3/50* (2013.01)

(58) Field of Classification Search
   CPC .................................. H02K 3/487; H02K 3/50
   USPC ........................................................ 310/214
   See application file for complete search history.

(56) References Cited

U.S. PATENT DOCUMENTS

| 7,557,486 B2* | 7/2009 | Choi ..................... D06F 37/304 310/154.33 |
| 2008/0122300 A1* | 5/2008 | Cho ........................ H02K 1/148 310/43 |
| 2009/0146513 A1 | 6/2009 | Bremner |
| 2013/0106237 A1 | 5/2013 | Jang et al. |
| 2013/0127271 A1* | 5/2013 | DeFilippis ............. H02K 1/185 310/59 |
| 2014/0028146 A1 | 1/2014 | Sugimoto et al. |
| 2014/0084741 A1 | 3/2014 | Iwasaki et al. |

FOREIGN PATENT DOCUMENTS

JP    2000217293 A    8/2000

OTHER PUBLICATIONS

International Search Report and Written Opinion for PCT Application No. PCT/US2015/022360, dated Jun. 26, 2015, pp. 1-11.

\* cited by examiner

*Primary Examiner* — Alex W Mok
(74) *Attorney, Agent, or Firm* — Cantor Colburn LLP (57) ABSTRACT

A conductor retention member for a stator core includes a body formed from a non-electrically conductive material. The body includes a radial outwardly facing edge and a radial inwardly facing edge. A plurality of openings extends between the radial inwardly facing edge and the radial outwardly facing edge formed in the body. The body is configured and disposed to be arranged at an axial end of the stator core with the plurality of openings registering with corresponding ones of a plurality of stator slots.

6 Claims, 8 Drawing Sheets

CONDUCTOR RETENTION MEMBER FOR A STATOR ASSEMBLY

BACKGROUND OF THE INVENTION

Exemplary embodiments pertain to the art of electric machines and, more particularly, to a conductor retention member for a stator assembly.

Many electric machines include a moveable element that rotates relative to a stationary element. The stationary element, referred to in some cases as a stator having a stator core that supports one or more conductors. The stator core may be formed by stacking and joining a number of laminations. The stator core may include a plurality of stator teeth that are spaced one from another by voids or stator slots. The stator slots receive the one or more conductors. In some cases the stator slots are open, in other cases the stator slots may be semi-closed. Semi-closed stator slots include projecting portions or teeth that support the one or more conductors to the stator core. Semi-closed stator slots are typically limited to axial insertion of the one or more conductors. Open stator slots may be filled by axial or radial insertion of the one or more conductors.

After loading with the one or more conductors, open stator slots are often subjected to a staking process. The staking process deforms a radially inward end of each of the teeth to partially close each of the stator slots and support the one or more conductors. Alternatively, slot wedges may be inserted into each of the stator slots to support the one or more conductors. Supporting the one or more conductors through semi-closed stator slots, staking, or stator wedges limits potential interference with the moveable element or rotor.

BRIEF DESCRIPTION OF THE INVENTION

Disclosed is a conductor retention member for a stator core. The conductor retention member includes a body formed from a non-electrically conductive material. The body includes a radial outwardly facing edge and a radial inwardly facing edge. A plurality of openings extends between the radial inwardly facing edge and the radial outwardly facing edge formed in the body. The body is configured and disposed to be arranged at an axial end of the stator core with the plurality of openings registering with corresponding ones of a plurality of stator slots.

Also disclosed is an electric machine including a housing, and a stator including a stator core having a first axial end, an opposing second axial end, and a plurality of stator slots extending between the first and second axial ends. The stator core is mounted to the housing. A rotor is rotatably mounted relative to the stator. A conductor retention member is mounted to the axial end of the stator core. The conductor retention member includes a body formed from a non-electrically conductive material. The body includes a radial outwardly facing edge and a radially inwardly facing edge. A plurality of openings extends between the radial inwardly facing edge and the radial outwardly facing edge formed in the body. The body is configured and disposed to be arranged at an axial end of the stator core with the plurality of openings registering with corresponding ones of a plurality of the stator slots.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
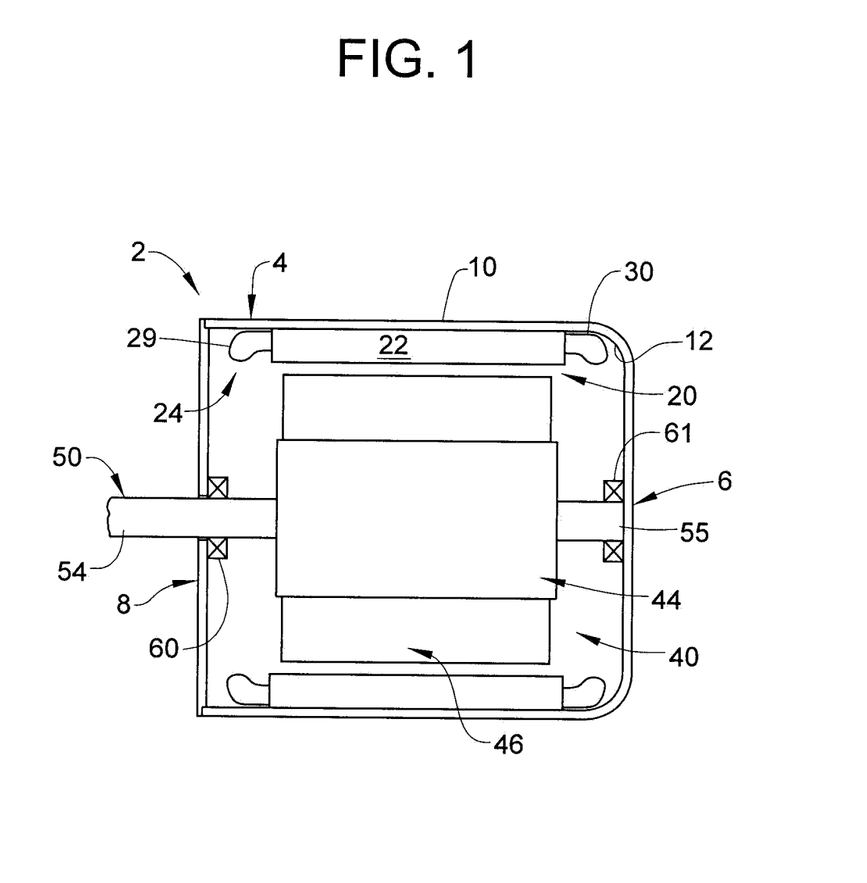
FIG. 1 depicts a side view of an electric machine including a stator core having a conductor retention member, in accordance with an exemplary embodiment.

An electric machine, in accordance with an exemplary embodiment, is indicated generally at 2, in FIG. 1. Electric machine 2 includes a housing 4 having an end wall 6 and a cover 8. Housing 4 includes an outer surface 10 and an inner surface 12. A stator 20 is fixedly mounted relative to inner surface 12. Stator 20 includes a stator core 22 and a plurality of stator windings 24. Plurality of stator windings 24 is supported by stator core 22 and includes a first end turn portion 29 and a second end turn portion 30. A rotor 40 is arranged within housing 4 and rotatably supported relative to stator 20.

Figure 2:
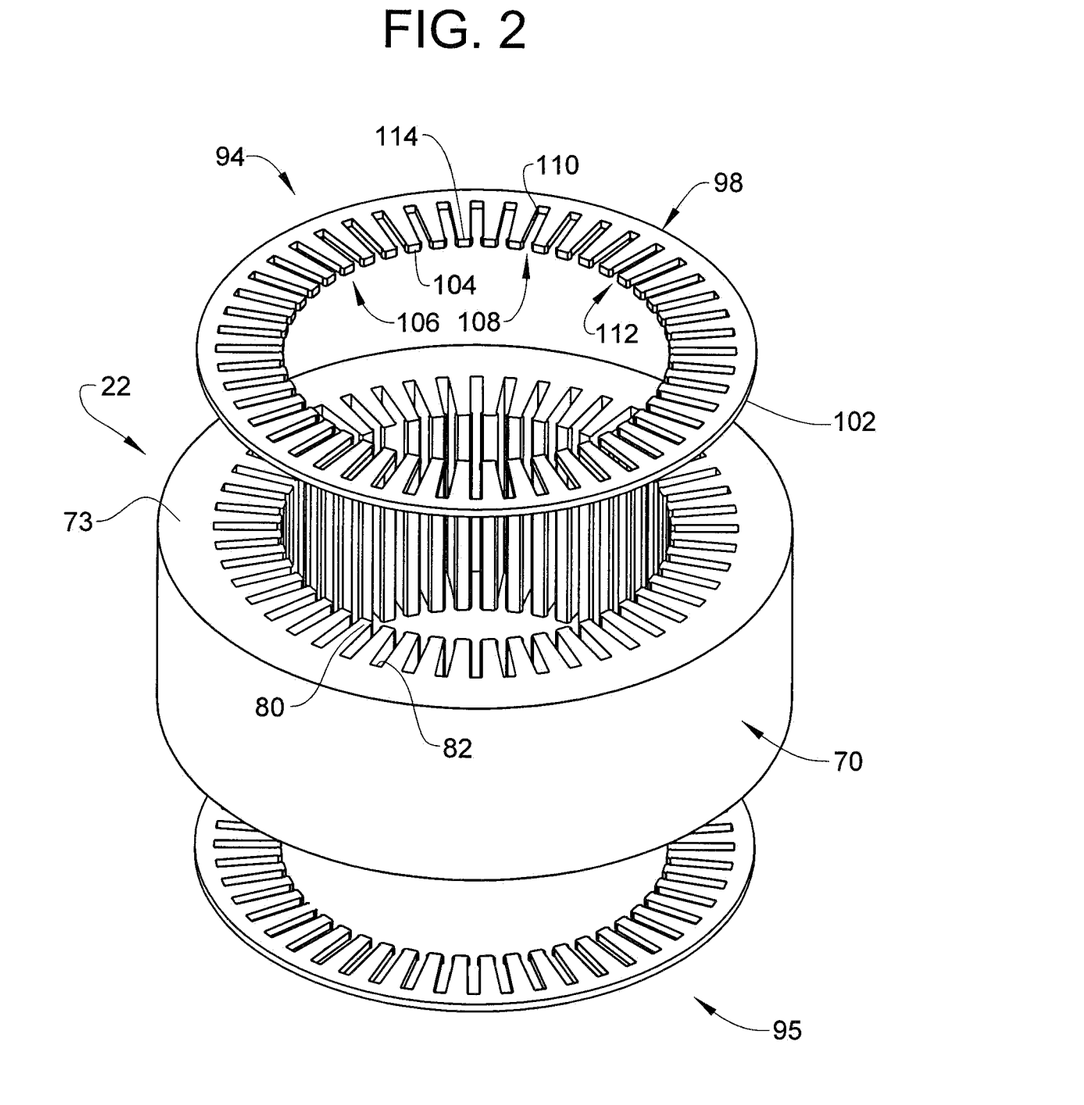
FIG. 2 depicts a disassembled view of the stator core of FIG. 1.

Rotor 40 includes a rotor body 44 that supports a plurality of rotor laminations 46. It should be understood, that rotor body 44 could also support rotor windings. Rotor body 44 is supported in housing 4 by a shaft 50. Shaft 50 extends from a first end 54 to a second end 55. First end 54 is supported at cover 8 by a first bearing 60 and second end 55 is supported at end wall 6 by a second bearing 61. As best shown in FIG. 2, stator core 22 includes a stator core body 70 having a first axial end 73 and an opposing second axial end (not separately labeled). Stator core body 70 includes a plurality of radially inwardly extending stator teeth, one of which is shown at 80, separated by a plurality of stator slots, one of which is shown at 82. In the exemplary embodiment shown, stator core 22 includes an open slot geometry. More specifically, stator teeth 80 are devoid of structure that extends into stator slots 82. Stator slots 82 support one or more conductors 88 (FIG. 3) that form a static field for electric machine 2.

In accordance with an exemplary embodiment, stator core 22 includes a conductor retention member 94 arranged at first axial end 73 that maintains conductors 88 within stator slots 82. Another conductor retention member 95 may be arranged at the second axial end (not separately labeled) of stator core 22. Conductor retention member 94 includes a body 98 that may be formed from a resilient non-electrically conductive material. Body 98 includes a radial outwardly facing edge 102 and a radial inwardly facing edge 104. A plurality of tooth elements 106 extends radially inwardly from radial outwardly facing edge 102. Tooth elements 106 are separated by a plurality of openings 108 shown in the form of slots 110. Radial inwardly facing edge 104 includes a plurality of interruptions or voids 112 that extend into openings 108. In this manner, each tooth element has a cantilevered end 114 at radial inwardly facing edge 104.

Figure 3:
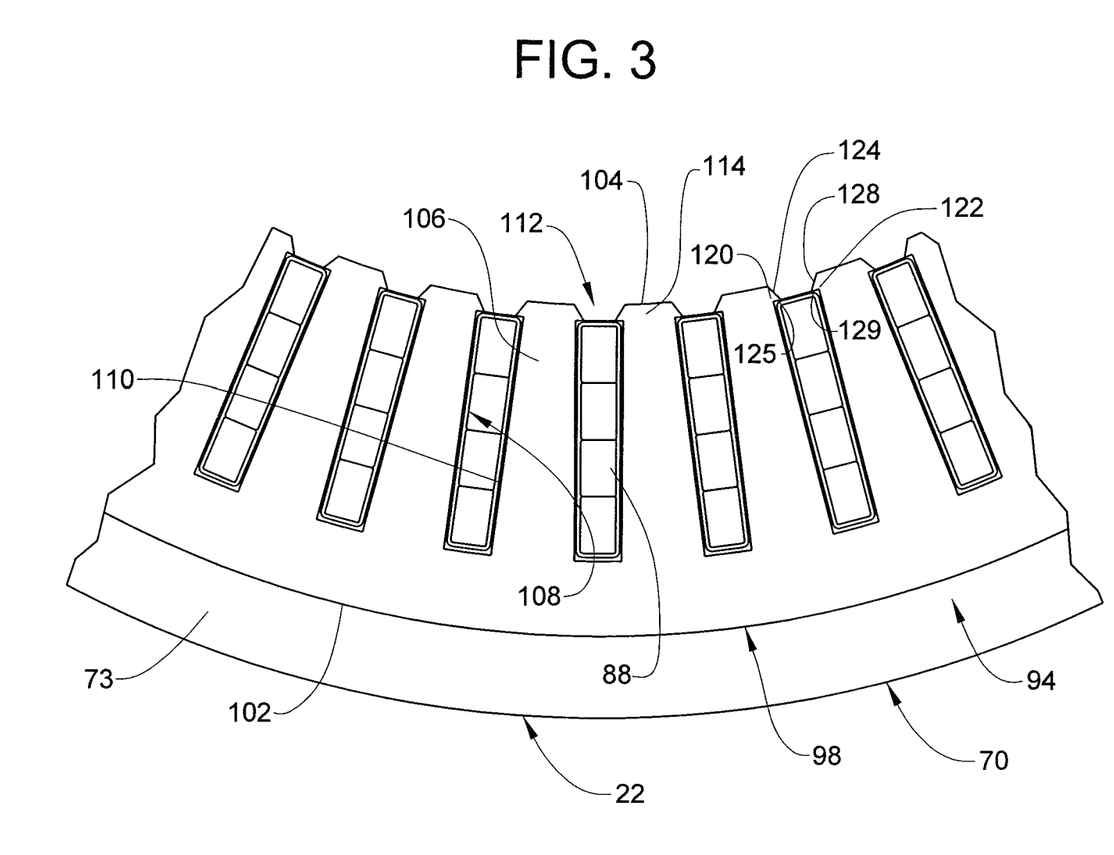
FIG. 3 depicts a partial plan view of a conductor retention member, in accordance with an aspect of the exemplary embodiment.

As shown in FIG. 3, each tooth element 106 includes a first circumferentially extending compliant retaining element 120 and a second circumferentially extending compliant retaining element 122 projecting from cantilevered end 114. First circumferentially extending compliant retaining element 120 includes a radial outward surface 124 and a radial inward surface 125. Similarly, second circumferentially extending compliant retaining element 122 includes a radial outward surface 128 and a radial inward surface 129. Each radial outward surface 124 and 128 is angled inwardly toward slot 110. Each radial inward surface 125 and 129 extends generally perpendicularly from the corresponding tooth element 106.

In this manner, when conductor retention member 94 is mounted to first axial end 73 of stator core 22, conductors 88 may be passed along radial outward surfaces 124 and 128 and into each stator slot 82. Radial outward surfaces 124 and 128 may deflect allowing conductor 88 easy passage into the associated stator slot 82. Radial inward surfaces 125 and 129 prevent conductors 88 from passing back out from the associated stator slot 82. Conversely, conductor retention member 94 may be mounted to stator core 22 after conductors 88 are in place. In this manner, conductors 88 may be loaded axially or radially into stator slots 82.

Figure 4:
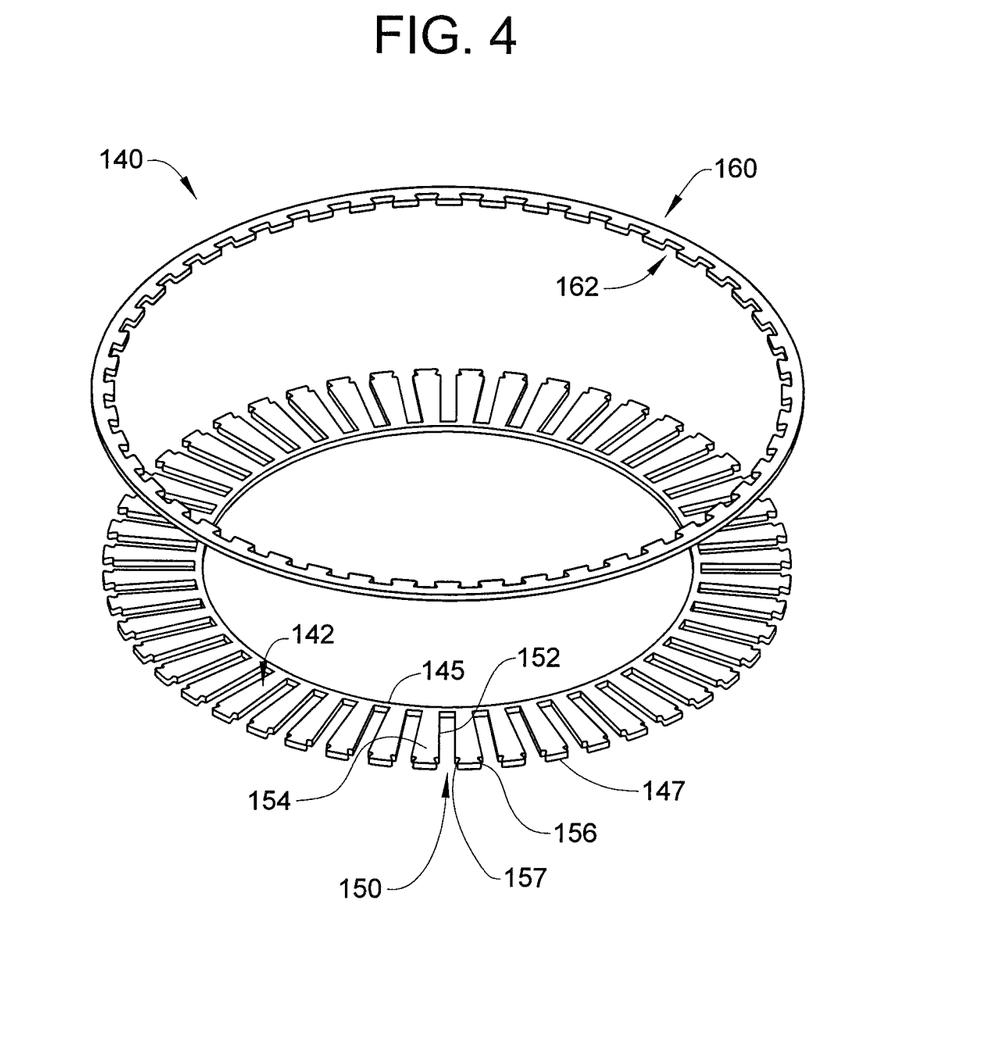
FIG. 4 depicts a disassembled plan view of a conductor retention member, in accordance with another aspect of the exemplary embodiment.
Figure 5:
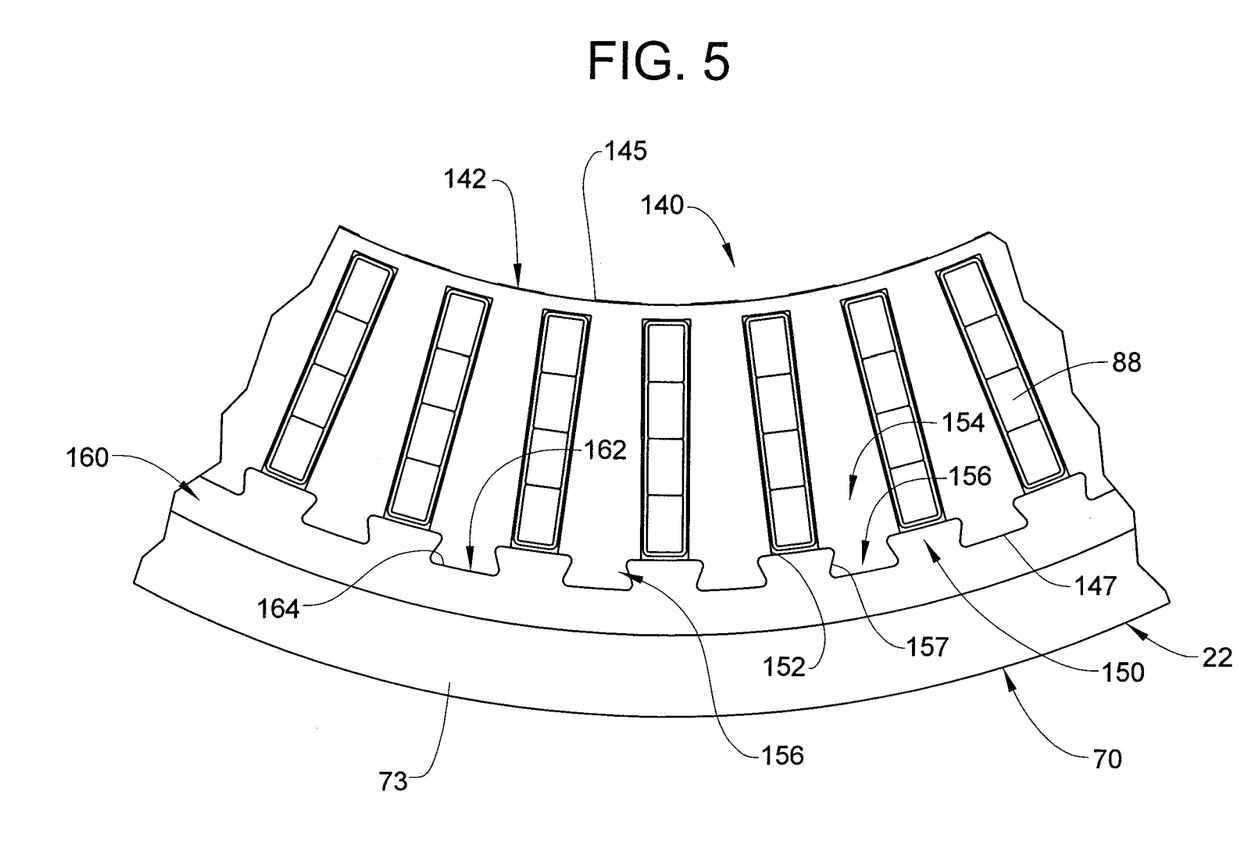
FIG. 5 depicts an assembled plan view of the conductor retention member of FIG. 4.

Reference will now be made to FIGS. 4 and 5, wherein like reference numbers represent corresponding parts in the respective views in describing a conductor retention member 140 in accordance with another aspect of the exemplary embodiment. Conductor retention member 140 is arranged at first axial end 73 and includes a body 142 that may be formed from a compliant non-electrically conductive material. Body 142 includes a continuous, un-interrupted, radial inwardly facing edge 145 and a discontinuous radial outwardly facing edge 147. More specifically, discontinuous radial outwardly facing edge 147 includes a plurality of interruptions 150. Each of the plurality of interruptions 150 extends into a respective one of a plurality of openings 152 formed in body 142. Each of the plurality of openings 152 is flanked by a corresponding tooth element, one of which is indicated at 154 that correspond to stator teeth 80. Each tooth element 154 includes a locking element 156 shown in the form of a dovetail element 157 extending outwardly from discontinuous radial outwardly facing edge 147.

Figure 6:
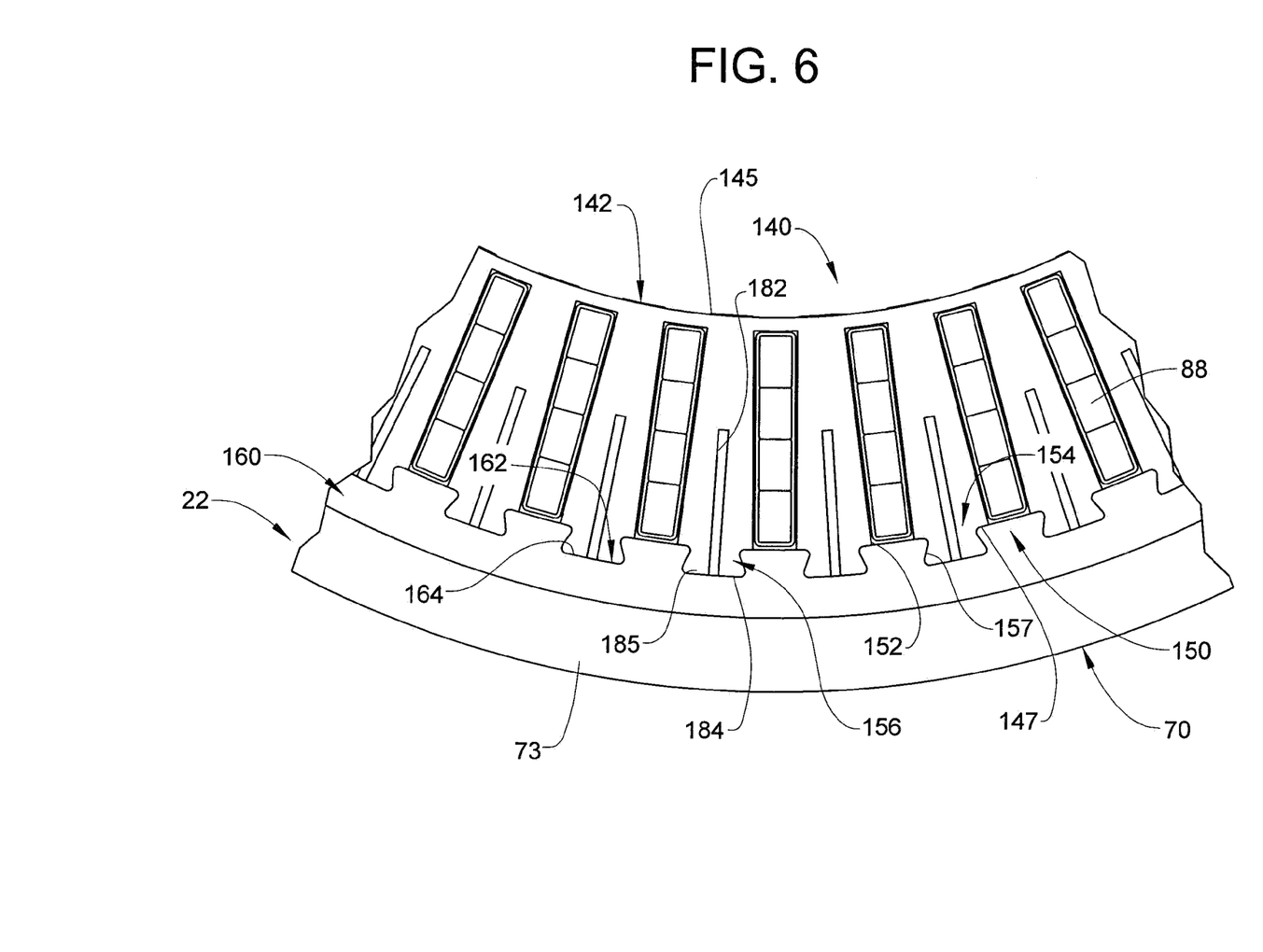
FIG. 6 depicts a plan view of a conductor retention member, in accordance with yet another aspect of the exemplary embodiment.

In further accordance with the exemplary embodiment shown, stator core 22 includes a locking member 160 arranged radially outwardly of conductor retention member 140. Locking member 160 may be formed from a compliant non-electrically conductive material and includes a plurality of locking sections 162 shown in the form of dovetail receiving members 164. Dovetail receiving members 164 inter-engage with corresponding ones of the plurality of dovetail elements 157 to join conductor retention member 140 and locking member 160. In this manner, conductors 88 may be loaded into stator core 22 radially or axially. Once loaded, conductor retention member 140 is mounted to stator core 22 to retain conductors 88 within stator slots 82. It should be understood that in lieu of locking member 160, dovetail elements 157 could inter-engage with structure provided on first axial end 73 of stator core 22. It should also be understood that rectangular openings or slots such as shown at 182 in FIG. 6 wherein like reference numbers represent corresponding parts in the respective views, could be formed in each tooth element 154. Slots 182 divide each locking element 156 into first and second locking element portions 184 and 185 that are circumferentially outwardly biased into engagement with corresponding ones of locking sections 162.

Figure 7:
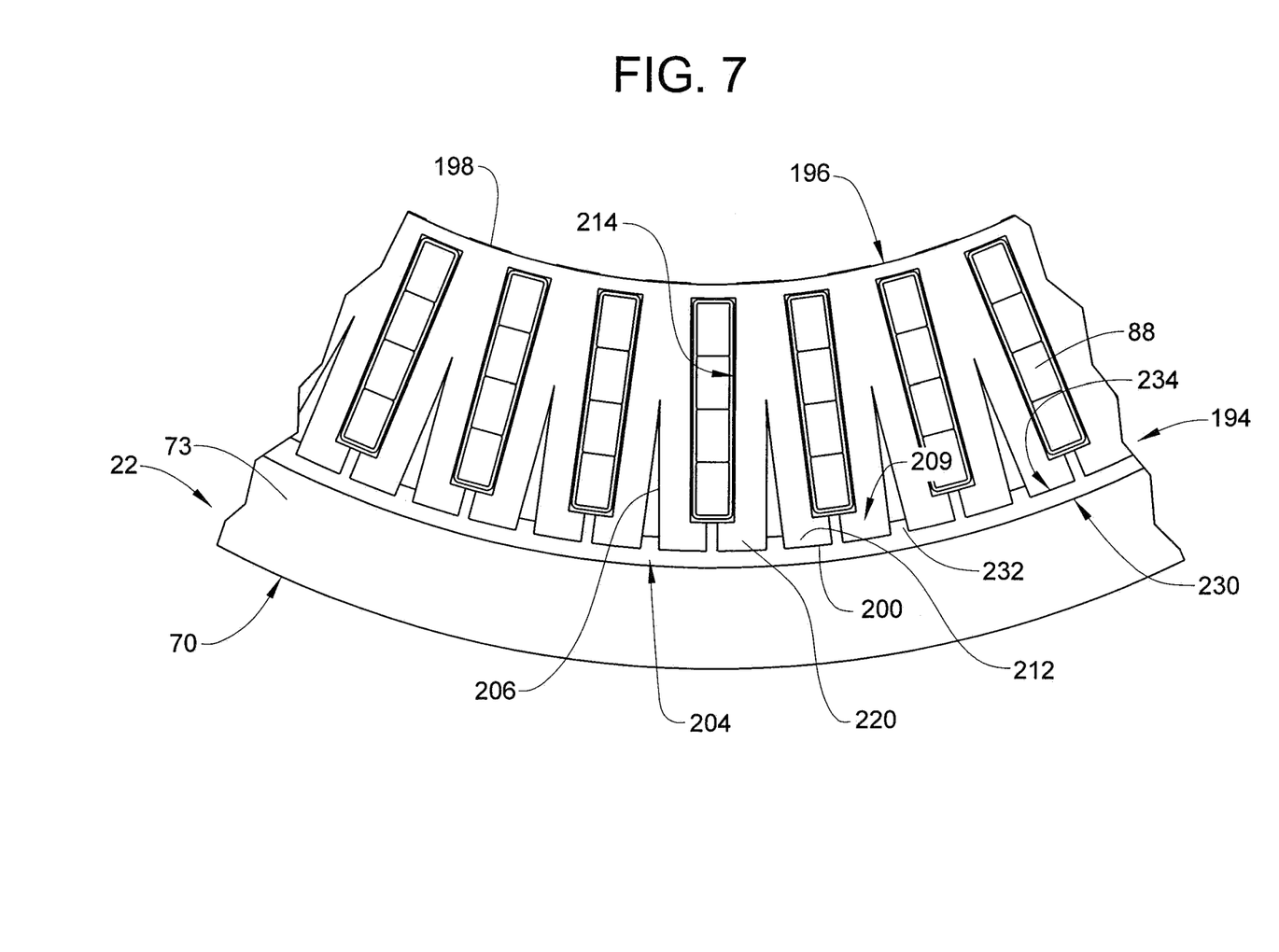
FIG. 7 depicts a plan view of a conductor retention member, in accordance with still yet another aspect of the exemplary embodiment.

Reference will now be made to FIG. 7, wherein like reference numbers represent corresponding parts in the respective views, in describing a conductor retention member 194, in accordance with yet another aspect of the exemplary embodiment. Conductor retention member 194 is arranged at first axial end 73 and includes a body 196 that may be formed from a compliant non-electrically conductive material. Body 196 includes a radial outwardly facing edge 198 and a radial inwardly facing edge 200. Radial outwardly facing edge 198 includes a plurality of interruptions 204 formed by slits 206 that extend toward radial inwardly facing edge 200. Slits 206 define a plurality of tooth elements 209 each having a cantilevered end 212. Tooth elements 209 correspond to stator teeth 80 and are flanked by a corresponding plurality of openings 214 that correspond to stator slots 82.

In further accordance with the exemplary embodiment shown, each cantilevered end 212 includes a first conductor locking element 219 and a second conductor locking element 220. First conductor locking element 219 extends circumferentially toward, and is spaced from, second conductor locking element 220. A locking member 230 is arranged radially outwardly of conductor retention member 194 and includes a plurality of projections, one of which is indicated at 232 that extends radially inwardly. Projections 232 define a plurality of locking sections 234 that receive respective ones of cantilevered ends 212. When each tooth element 209 is installed, locking sections 234 urge first and second conductor locking elements 219 and 220 toward one another to affix conductor retention member 194 to first axial end 73.

Figure 8:
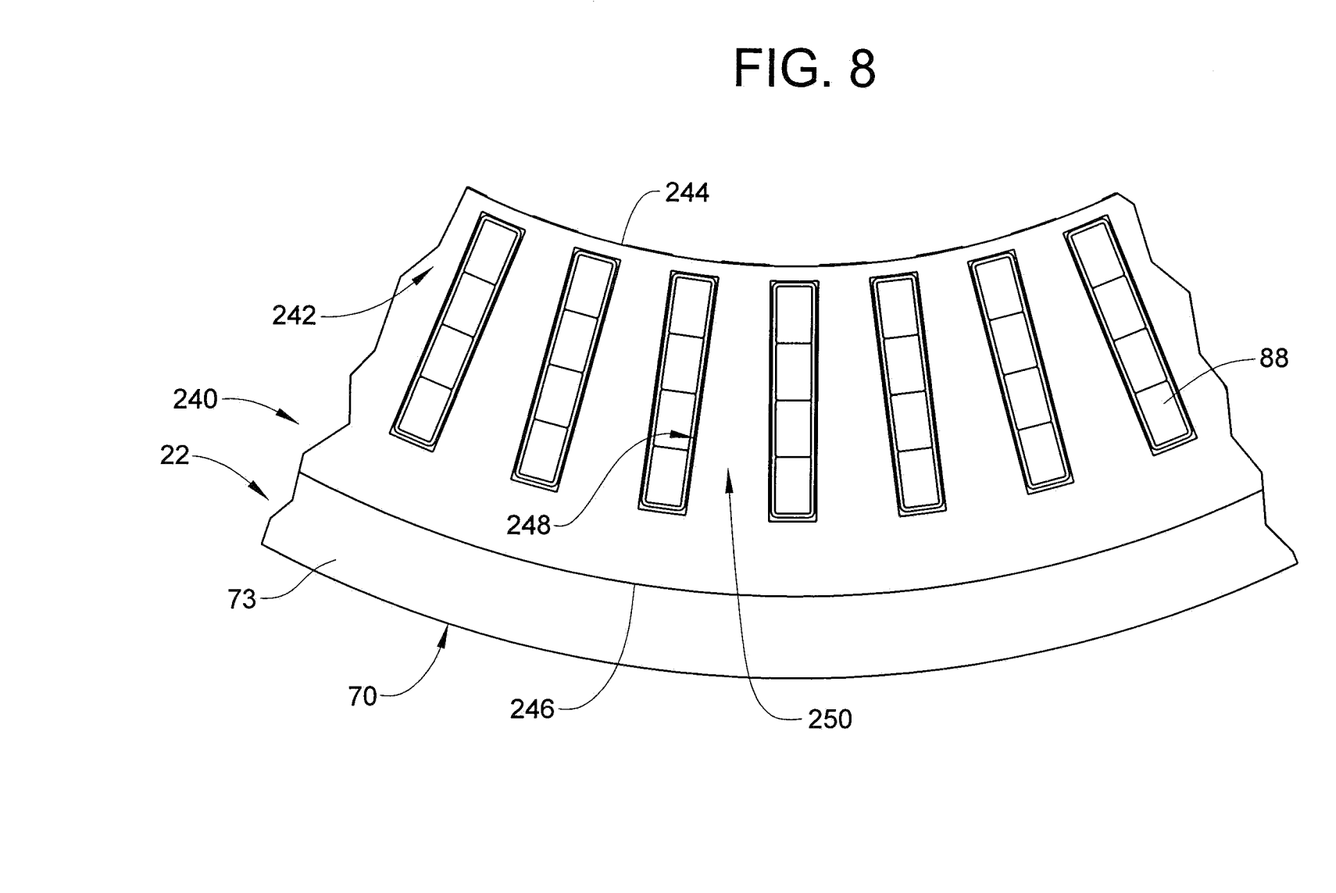
FIG. 8 depicts a plan view of a conductor retention member, in accordance with yet still another aspect of the exemplary embodiment.

Reference will now be made to FIG. 8, wherein like reference numbers represent corresponding parts in the respective views in describing a conductor retention member 240, in accordance with still yet another exemplary embodiment. Conductor retention member 240 is arranged at fist axial end 73 and includes a body 242 that may be formed from a compliant non-electrically conductive material. Body 242 includes a continuous radial inwardly facing edge 244 and a continuous radial outwardly facing edge 246. A plurality of openings 248 extends between continuous radial inwardly facing edge 244 and continuous radial outwardly facing edge 246. Openings 248 formed in body 242 define a plurality of tooth elements 250 that correspond to stator teeth 80. Conductor retention member 240 is positioned at first axial end 73 and conductors 88 are inserted radially into stator core 22.

At this point it should be understood that the conductor retention member, in accordance with the exemplary embodiments, may be mounted to an axial end or both axial ends of a stator core. The conductor retention member may be formed from a compliant material that facilitates mounting after conductors are fed into the stator core, or may be mounted prior to the conductors being fed into the stator core. The conductor retention member may be used in stator cores with open slot geometry as well as stator cores with a semi-open slot geometry. The conductor retention member supports the conductors to the stator core while reducing manufacturing steps, the number of parts required to retain conductors, and lowers an over all manufacturing cost of an electric machine.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims.

What is claimed is:

1. A conductor retention member for a stator core comprising:
    a body formed from a non-electrically conductive material, the body including a radially outwardly facing edge and a radially inwardly facing edge, the body being positionable exclusively upon an axial end of the stator core;
    a plurality of openings extending between the radially inwardly facing edge and the radially outwardly facing edge formed in the body, wherein the body is configured and disposed to be arranged at an axial end of the stator core with the plurality of openings registering with corresponding ones of a plurality of stator slots; and
    a plurality of voids formed in the radial inwardly facing edge, the plurality of voids forming a plurality of tooth elements, each of the plurality of tooth elements including at least one circumferentially extending compliant retaining element having a radially outward surface angled relative to the radially inwardly facing edge, the radially outward surface guiding conductors into corresponding ones of the plurality of voids.

2. The conductor retention member according to claim 1, wherein the at least one circumferentially extending compliant retaining element includes a radially inward surface that is substantially perpendicular to the associated one of the plurality of tooth elements.

3. The conductor retention member according to claim 1, wherein the radially outwardly facing edge comprises a continuous edge and the radially inwardly facing edge comprises a discontinuous edge having a plurality of interruptions that define, at least in part, respective ones of the plurality of voids.

4. An electric machine comprising:
    a housing;
    a stator including a stator core having a first axial end, an opposing second axial end and a plurality of stator slots extending between the first and second axial ends, the stator core being mounted to the housing;
    a rotor rotatably mounted relative to the stator; and
    a conductor retention member mounted to the axial end of the stator core, the conductor retention member comprising:
        a body formed from a non-electrically conductive material, the body including a radially outwardly facing edge and a radially inwardly facing edge, the body being positioned exclusively upon the axial end of the stator core;
        a plurality of openings extending between the radially inwardly facing edge and the radially outwardly facing edge formed in the body, wherein the body is configured and disposed to be arranged at an axial end of the stator core with the plurality of openings registering with corresponding ones of the plurality of stator slots; and
        a plurality of voids formed in the radially inwardly facing edge, the plurality of voids forming a plurality of tooth elements, each of the plurality of tooth elements including at least one circumferentially extending compliant retaining element having a radially outward surface angled relative to the radially inwardly facing edge, the radially outward surface guiding conductors into corresponding ones of the plurality of voids.

5. The electric machine according to claim 4, wherein the at least one circumferentially extending compliant retaining element includes a radially inward surface that is substantially perpendicular to the associated one of the plurality of tooth elements.

6. The electric machine according to claim 4, wherein the radially outwardly facing edge comprises a continuous edge and the radially inwardly facing edge comprises a discontinuous edge having a plurality of interruptions that define, at least in part, respective ones of the plurality of voids.

* * * * *